(No Model.)
D. J. POWERS.
ANTI FRICTION BEARING.
No. 313,022. Patented Feb. 24, 1885.
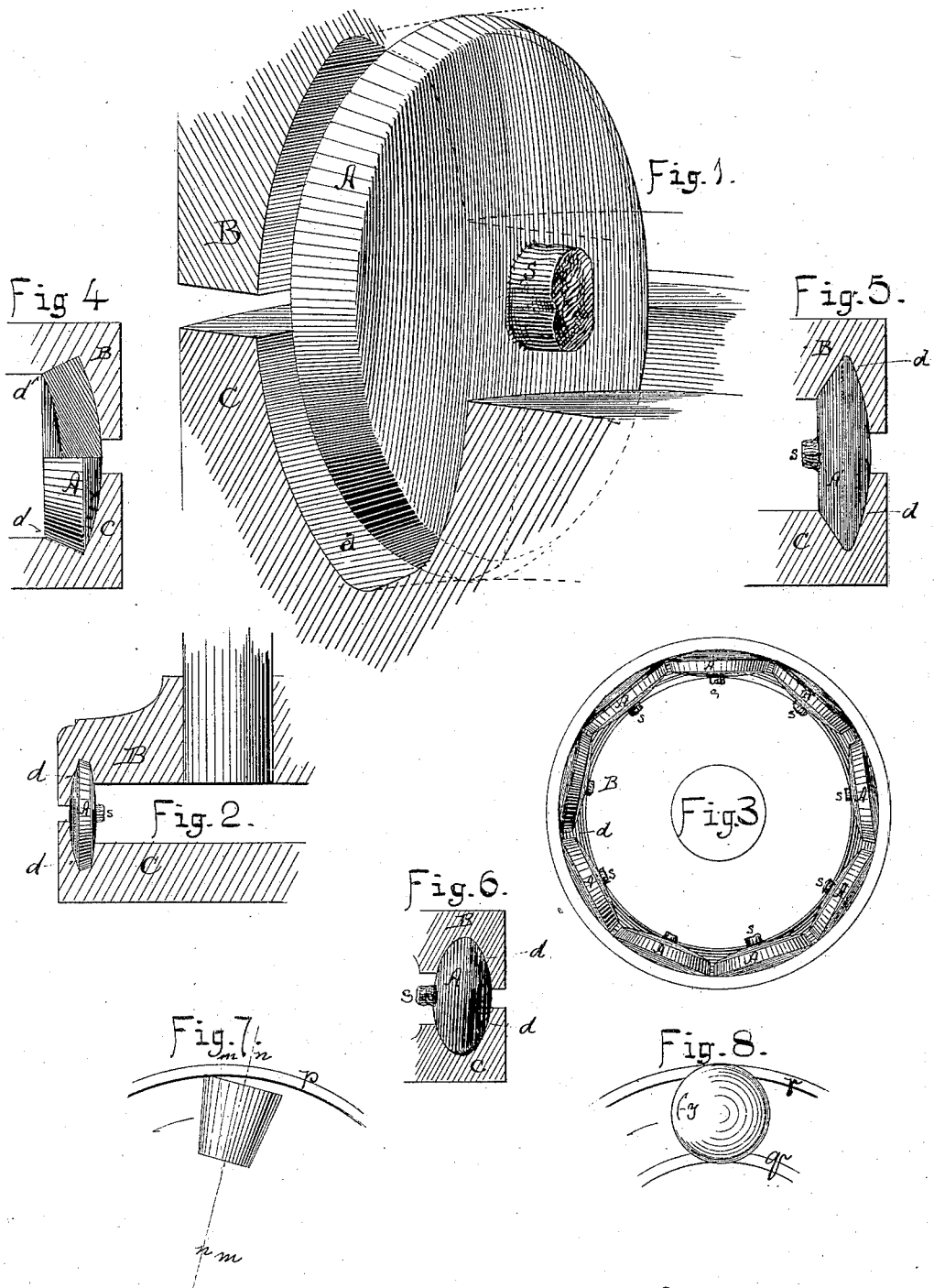
WITNESSES
H. M. Real
E. D. Clapp
INVENTOR
David J. Powers
By his Attorney

UNITED STATES PATENT OFFICE.

DAVID J. POWERS, OF CHICAGO, ILLINOIS.

ANTI-FRICTION BEARING.

SPECIFICATION forming part of Letters Patent No. 313,022, dated February 24, 1885.

Application filed January 12, 1885. (No model.)

*To all whom it may concern:*

Be it known that I, DAVID J. POWERS, of Chicago, in the county of Cook and State of Illinois, have invented new and useful Improvements in Anti-Friction Rollers; and I do hereby declare that the following is a full and accurate description of said invention.

This invention relates to anti-friction rollers between surfaces whereof the axis of rotation is not parallel with the axis of the anti-friction rollers, as where said rollers form a bearing for a vertical shaft. Generally the axis of rotation is perpendicular to the axes of said rollers, but may be at a less angle than ninety degrees. Whether perpendicular or inclined, the axes of said rollers are always radial to said axis of rotation. This restriction is stated because anti-friction rollers in horizontal bearings wherein the axes of rotation are all parallel are not subject to the same disturbing causes, and therefore do not operate under the same conditions. In the large class of articles having frictional surfaces capable of being relieved by the interposition of anti-friction rollers spherical rollers have mostly been employed, but disk, conical, and spindle shaped rollers have also been employed. Sometimes the rollers have been placed free in their trackway. Sometimes they have been provided with spacing-plates, and they have been mounted upon axial spindles. Spherical rollers free in circular trackways must be perfectly spherical, and even then, unless said tracks are of large diameter, they will soon grind out of spherical truth and cease to roll. This is because in rolling in a circular track the exterior line of bearing is of larger radius than the inner line of bearing, whereas the surface speed of the rotating sphere is the same on all lines. This causes the sphere to slip and grind on the inner or outer lines of bearing. If the sphere is free, the resistance due to this slip causes a lateral rotation as well as a progressive rotation, and a slight untruth soon becomes magnified. Conical rollers continually tend to slip out radially, and the consequent end-thrust causes a continual end friction and tendency to deflect the axis away from its proper radial position. Disks necessarily stand tangential to the curve of the track, and in rolling around in such track they continually grind their outer edge angles against the outer edge of the track. Spindle-shaped rollers not only are liable to the end-thrust of conical rollers, but their shape aggravates the axial displacement consequent upon end contact with the outer side of the track. The unequal frictions and axial displacement referred to are mitigated by providing each roller with an axial spindle and suitable bearings; but the cost is thereby materially increased. The unequal friction and wear above mentioned are not modified by the use of spacing-plates. Such plates merely retain the rollers in their assigned positions as to each other, and prevent said rollers from bunching and rubbing together; but friction against the plate is merely substituted for friction against each other. For these reasons the satisfactory use of anti-friction rollers has been confined to mechanism where the cost of such rollers is a secondary consideration.

My improvement has exclusive reference to anti-friction rollers free in their trackway without axial spindles or spacing-plates.

I have obviated some of the defects above mentioned entirely, and have greatly mitigated the remainder, by means of a roller convex on its outer side and having the peripheral diameter greater than the axial diameter, and with surfaces converging toward the periphery, and trackways above and below corresponding in cross-section to the sectional configuration of the roller. The roller may be approximately or actually an oblate spheroid, or its sectional lines may be angular. By this means the roller cannot shift the position of its place or axis of revolution as to its own mass, because its trackway is less in width than the greater diameter of the roller. The end-thrust almost, if not entirely, disappears, because, being placed in a trackway having converging sides, the roller runs in a groove and tends to move toward the lower part of the same. Axial displacement cannot occur, because the roller fits and conforms to the configuration of the groove. There is no edge grinding, because, notwithstanding the plane of the roller is tangential to the outer curve of the track, the exterior surface of the outer side of the roller conforms substantially to the curve of the track. I am therefore enabled to use cast-metal rollers in the condition in which they come from the molds with the sprue or gate adhering, and therefore at the least possible cost.

The essential feature of this invention is a roller whose axial diameter is less than its equatorial diameter, or oblate-spheroidal in axial section, and a circular trackway groove in transverse section corresponding substantially with the axial section of said roller whereby said roller is caused to rotate without an axial spindle, without shifting the position of its axis, without end-thrust, without axial displacement, and without grinding its edges against the outer track.

Figure 1 is a perspective view of my roller. Fig. 2 is a transverse vertical section showing the track and one roller in position. Fig. 3 is a plan of the roller-trackway and rollers in position. Figs. 4, 5, and 6 represent modifications. Figs. 7 and 8 represent the action of conical and spherical rollers.

A is my roller, made, preferably, of cast metal. It may be considerably varied in sectional form, but its axial diameter must be less than its equatorial diameter, and one side, which must be the outer side when in use, must be convex to correspond approximately with the curvature the track in which it runs.

In the several forms shown the same essential features—viz., larger diameter equatorially; exterior convexity approximately corresponding with the curvature of the trackway, and exact conformation to the transverse figure of the trackway on the lines of bearing-surfaces, are present.

B is the bearing-surface, and C is the other and opposite surface. Both are provided with similar circular grooves $d$, which conform in transverse section with the roller A to be used therein. One part—it may be either B or C—may be non-rotating, while the other part rotates freely upon the axis of the circular grooves $d$ and travels upon the interposed rollers A. These rollers may be employed for a great variety of purposes—for furniture-casters, vertical spindles and shafts, turn-tables, and all places where the principal rotating member has a thrust in the direction of its axis. Being unable to shift the position of its axis of rotation, it becomes possible to employ rollers whose surfaces are not absolutely true for small bearings, and they may be produced by casting in sand molds with sufficient accuracy; but if it were necessary to remove from each small roller the small axial sprue $s$, or if it were necessary to perforate each small roller, the enhanced cost would greatly lessen their utility.

By my invention the plane and axis of rotation are maintained always at the same place in the roller, and therefore the sprue $s$ may remain adhering. So far as I know, no bearing-roller has heretofore been constructed on which the sprue could have been permitted to remain.

In Fig. 7 the effect of end friction on a conical roller is illustrated in a somewhat exaggerated form, the true radial axis being the line $m\ m$, but the actual axis of rotation being the line $n$, the deflection being due to friction of the end of the roller against the surrounding rim $p$.

In Fig. 8 I have illustrated the effect on a spherical roller of traction-lines at different distances from the center, the traction-line $r$ being in the figure about one-third of the radius more distant from the center than the traction-line $q$. The surface speed of the sphere will necessarily be the same over both of said lines, and the consequent slip and friction on one of them will cause a horizontal rotation—say in the direction of the arrow $y$—and an abrasion of the surface of the sphere. Both of these obstructive effects are avoided by my invention.

Having described my invention, I claim as new—

1. An anti-friction roller whereof the peripheral diameter is greater than the axial diameter, the cross-section presents diverging surfaces from the periphery toward the axis, and the outer side convex, whereby said roller is adapted to traverse a circular groove whose cross-section corresponds with the bearing-surface of said roller without ability to shift its plane or axis of revolution as to its own mass.

2. An imperforate anti-friction roller, the peripheral diameter greater than the axial diameter, and the bearing-surfaces near the periphery converging to the line of greatest diameter, whereby said roller is adapted to traverse a groove of corresponding cross-section without an axial spindle, and without ability to shift the plane or axis of revolution as to its own mass.

3. An anti-friction roller in cross-section approximately oblate-spheroidal, whereby it is adapted to traverse a groove trackway of corresponding cross-section without ability to change the position of its plane or axis of rotation as to its own mass, and having the sprue $s$ still adherent.

4. An anti-friction roller, A, greater in equatorial than in axial diameter, convex on its outer side, combined with bearing-plates B C, each provided with a circular groove, $d$, having a transverse sectional figure corresponding with the axial sectional form of said roller, as set forth.

DAVID J. POWERS.

Witnesses:
FREDERICK C. GOODWIN,
E. L. HUBER.